United States Patent
Paczkowski et al.

(10) Patent No.: US 9,526,121 B1
(45) Date of Patent: Dec. 20, 2016

(54) UNIFIED COMMUNICATION ACCESS SYSTEM

(75) Inventors: Lyle Walter Paczkowski, Mission Hills, KS (US); Pallavur Sankaranaraynan, Overland Park, KS (US); Warren B. Cope, Olathe, KS (US); Manish Mangal, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1852 days.

(21) Appl. No.: 12/690,648

(22) Filed: Jan. 20, 2010

(51) Int. Cl.
*H04W 76/02* (2009.01)
*H04W 88/18* (2009.01)

(52) U.S. Cl.
CPC ......... *H04W 76/021* (2013.01); *H04W 88/182* (2013.01)

(58) Field of Classification Search
CPC .......................... H04W 76/021; H04W 88/182
USPC .................................................. 370/352, 356
See application file for complete search history.

(56) References Cited

U.S. PATENT DOCUMENTS

| | | | |
|---|---|---|---|
| 2005/0249196 A1 | 11/2005 | Ansari et al. | |
| 2006/0140200 A1* | 6/2006 | Black et al. | 370/401 |
| 2006/0168111 A1* | 7/2006 | Gidwani | 709/218 |
| 2007/0091878 A1* | 4/2007 | Croak et al. | 370/356 |
| 2007/0105531 A1* | 5/2007 | Schroeder, Jr. | 455/411 |
| 2007/0220573 A1* | 9/2007 | Chiussi et al. | 725/114 |
| 2008/0160995 A1* | 7/2008 | Thiebaut et al. | 455/433 |

* cited by examiner

*Primary Examiner* — Khaled Kassim (57) ABSTRACT

Embodiments disclosed herein provide systems and methods that allow a mobile device to fully access unified communication services of a carrier. In a particular embodiment, a control system receives a call for a unified communications service and determines whether the mobile device is associated with the unified communication service. If the mobile device is not associated with the unified communication service, then the call is connected to a unified communication system to provide access to a first portion of the unified communication service. If the call is associated with the services, then the call is assigned a virtual number and connected to an intermediate communication system, which determines at least a second portion of the unified communication service associated with the virtual number. The call is then connected to the unified communication system to provide access to the first and second portions of the unified communication service.

13 Claims, 9 Drawing Sheets

UNIFIED COMMUNICATION ACCESS SYSTEM

TECHNICAL BACKGROUND

Unified communication services allow for the integration of real time communication services, such as voice calling and instant messaging, with non-real time communication services, such as voicemail and short message service (SMS). For example, unified communication services may allow multiple phones to be accessed by a single phone number and have the same voicemail inbox. A unified communication system may provide at least a subset of the services that make up unified communication services.

In some cases, other systems on a communication network, such as an Internet Protocol Multimedia Subsystem (IMS) platform, may be necessary to provide other subsets of unified communication services. Mobile devices that access the unified communication system on the same communication network as the IMS platform may be automatically routed through the IMS platform to the unified communication system. However, mobile devices that are not on the same network as the IMS platform may not be routed through the IMS platform and, thus, may only be provided with the subset of unified communication services provided by the unified communication system.

OVERVIEW

Embodiments disclosed herein provide systems and methods that allow a mobile device to fully access unified communication services of a carrier. In a particular embodiment, a control system receives a call for a unified communication service originated by a mobile device in a first carrier network. The control system then determines whether the mobile device is associated with the unified communication service. If the mobile device is not associated with the unified communication service, then the control system connects the call to a unified communication system to provide access to only a first portion of the unified communication service. If the mobile device is associated with the unified communication service, then the control system connects the call to an intermediate communication system in a second carrier network using a virtual number. The intermediate communication system receives the call and the virtual number and determines at least a second portion of the unified communication service associated with the virtual number. Additionally, the intermediate communication system connects the call to the unified communication system to provide access to both the first portion of the unified communication service and the second portion of the unified communication service.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
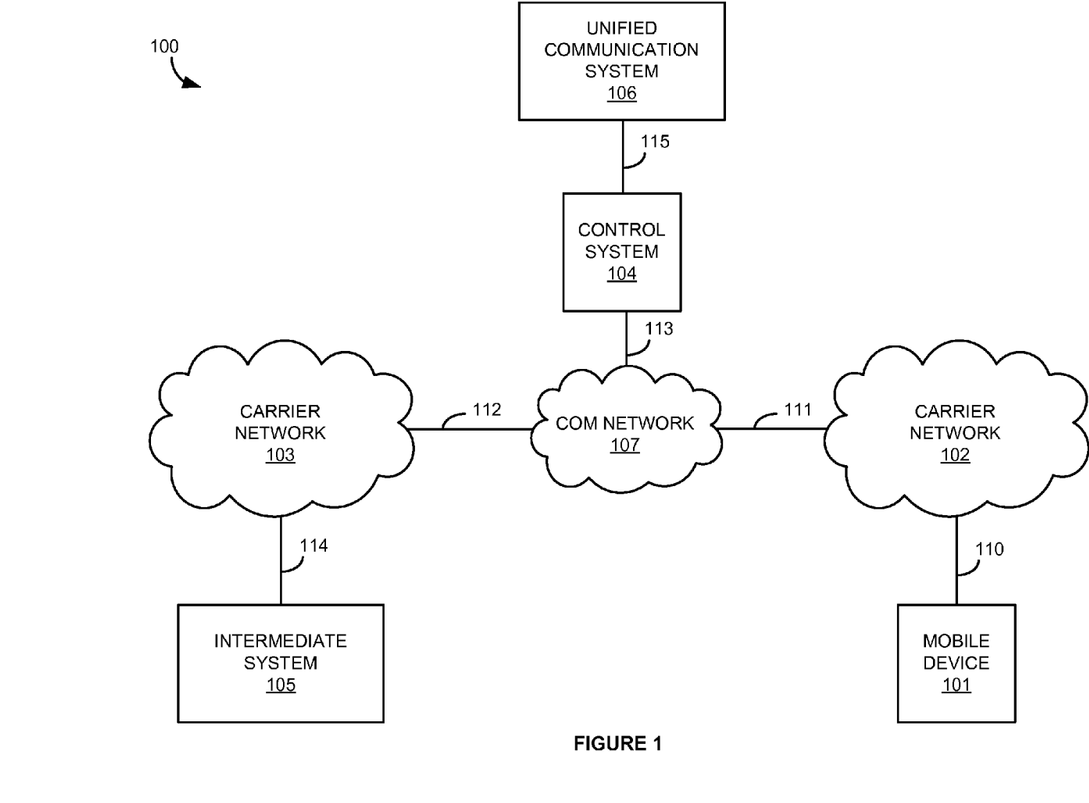
FIG. 1 illustrates a wireless communication system.

FIG. 1 illustrates wireless communication system 100. Wireless communication system 100 includes mobile device 101, carrier network 102, carrier network 103, control system 104, intermediate system 105, unified communication system 106, and communication network 107. Mobile device 101 and carrier network 102 communicate over wireless link 110. Carrier network 102 and communication network 107 communicate over link 111. Communication network 107 and carrier network 103 communicate over link 112. Communication network 107 and control system 104 communicate over link 113. Carrier network 103 and intermediate system 105 communicate over link 114. Control system 104 and unified communication system 106 communicate over link 115.

In operation, communication network 100 is capable of providing unified communication services. Unified communication services allow for the integration of real time communication services, such as voice calling and instant messaging, with non-real time communication services, such as voicemail and short message service (SMS). Unified communication system 106 provides at least a subset of the unified communication services. Intermediate system 105 is a system within carrier network 103 that may provide, or enable, another subset of the unified communication service, such as SMS, trigger detection, or the like. Therefore, a call request for a unified communication service must go through both intermediate system 105 and unified communication system 106 in order to access all subsets of the unified communication service.

If mobile device 101 requests access to a unified communication service from within carrier network 103, then the request will be sent through intermediate system 105 before being routed to unified communication system 106. Mobile device 101 will then be capable of accessing all subsets of the unified communication service to which mobile device 101 is entitled. However, if mobile device 101 requests access to a unified communication service from within carrier network 102, then the request may not be routed through intermediate system 105 before being routed to unified communication system. In that case mobile device 101 will only be able to access the first subset of the unified communication service that is provided by unified communication system 106, but not the second subset of the unified communication service that is provided by intermediate system 105.

In either situation, mobile device 101 will only be provided with the subset of the unified communication service that is provided by intermediate communication system 105 if mobile device 101 is associated with the unified communication service. Mobile device 101 may be associated with the unified communication service if it belongs to, or is supplied by, a customer of the unified communication service or has otherwise been given the permissions necessary to access the unified communication service. The permissions necessary to access the unified communication service may be provided by the user, possibly in the form of a identification code entered into mobile device 101.

Figure 2:
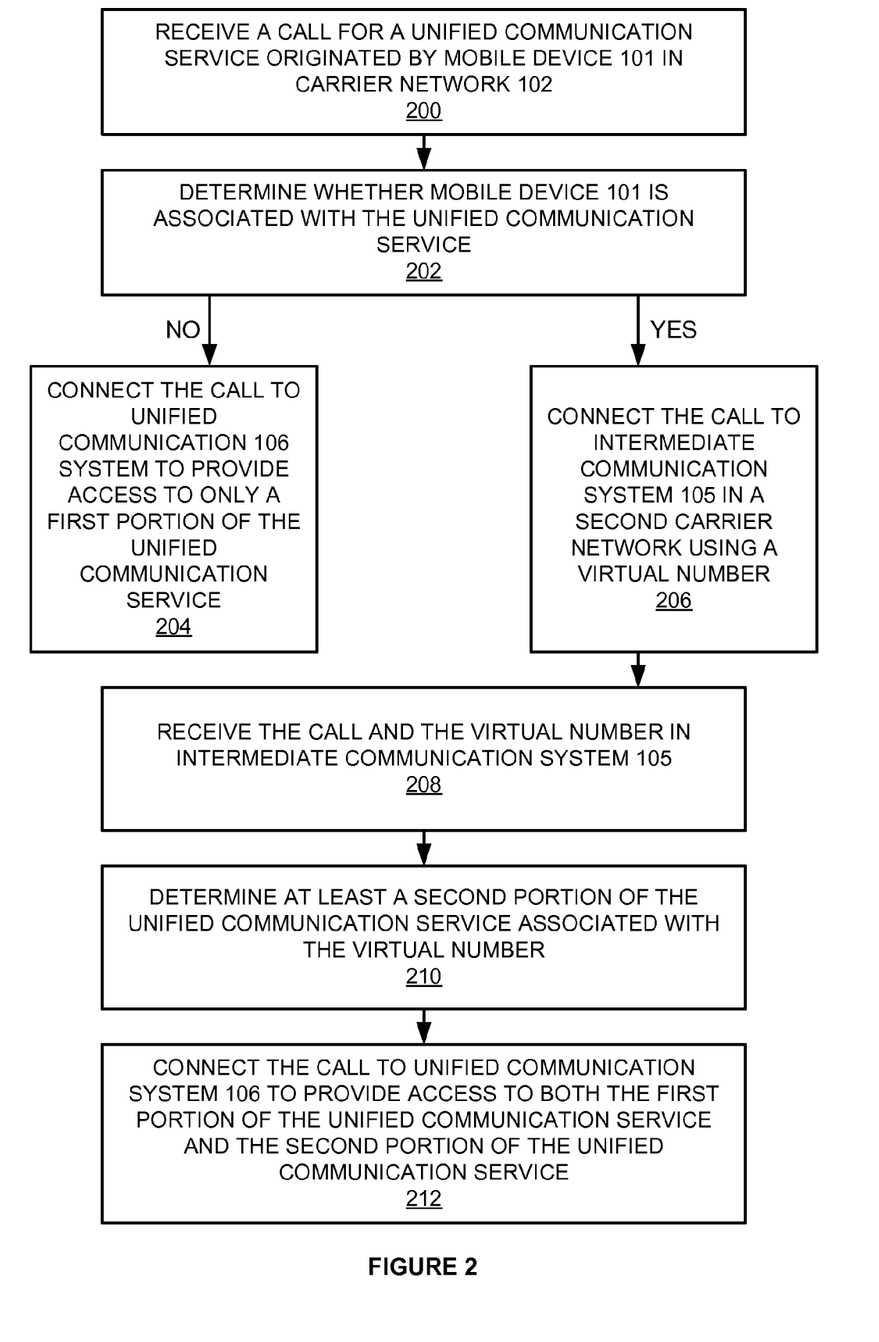
FIG. 2 illustrates the operation of a wireless communication system.

FIG. 2 illustrates the operation of wireless communication system 100 to provide call routing through intermediate system 105 in order to provide a unified communication service. Control system 104 receives a call for a unified communication service from mobile device 101 in carrier network 102 (step 200). The call may be a standard voice call but may also be a VoIP call or a request for some other unified communication service such as voicemail or messaging.

Control system 104 then determines whether mobile device 101 is associated with the unified communication service (step 202). Mobile device 101 may be associated with the unified communication service if the user of mobile device 101 is a customer of the unified communication service or otherwise has the permissions necessary to use the unified communication service.

If mobile device 101 is not associated with the unified communication service, then control system 102 connects the call to a unified communication system to provide access to only a first portion of the unified communication service (step 204). Thus, unassociated mobile device 101 is not provided with any of the portions of unified communication services that are provided, or enabled, by intermediate system 103.

If mobile device 101 is associated with the unified communication service, then control system 102 connects the call to intermediate communication system 105 in carrier network 103 using a virtual number (step 206). The virtual number may be a phone number, or some other number, that intermediate system 103 recognizes as being associated with the unified communication service. Intermediate communication system 103 receives the call and the virtual number (step 208) and determines at least a second portion of the unified communication service associated with the virtual number (step 210).

Intermediate communication system 103 then connects the call to the unified communication system to provide access to both the first portion of the unified communication service and the second portion of the unified communication service (step 212). Therefore, intermediate system 103 provides the second portion of the unified communication services to the call while the unified communication system provides the first portion of the unified communication services.

Figure 3:
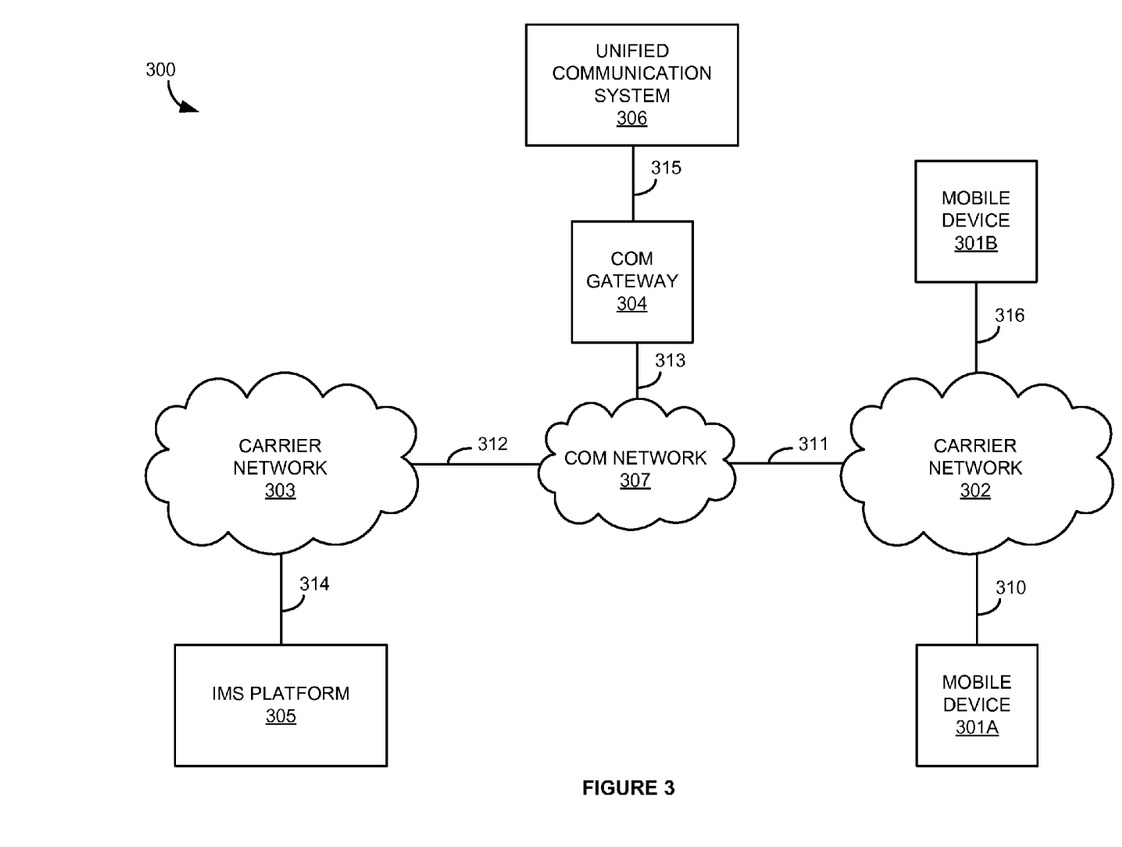
FIG. 3 illustrates a wireless communication system.

FIG. 3 illustrates wireless communication system 300 in an example embodiment. Wireless communication system 300 includes mobile device 301A, mobile device 301B, carrier network 302, carrier network 303, communication gateway 304, Internet Protocol Multimedia Subsystem (IMS) platform 305, unified communication system 306, and communication network 307. Mobile device 301A and carrier network 302 communicate over wireless link 310. Mobile device 301B and carrier network 302 communicate over wireless link 316. Carrier network 302 and communication network 307 communicate over link 311. Communication network 307 and carrier network 303 communicate over link 312. Communication network 307 and control system 304 communicate over link 313. Carrier network 303 and IMS platform 305 communicate over link 314. Control system 304 and unified communication system 306 communicate over link 315.

Wireless links 310 and 316 use the air or space as the transport media. Wireless links 310 and 316 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 311-315 use metal, glass, air, space, or some other material as the transport media. Communication links 311-315 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 311-315 could be a direct link or may include intermediate networks, systems, or devices.

Communication gateway 304 provides access to unified communication system 306. Communication gateway 304 is shown external to carrier network 103 but may be located in carrier network 303 or integrated into either IMS platform 305 or unified communications system 306.

Unified communication system 306 is shown external to carrier network 303 and communication network 307 but may be part of either network. Unified communication system 306 may be integrated into IMS platform 305.

IMS platform 305 provides a subset of unified communication services but may also provide other services for carrier network 303.

In FIG. 3 IMS platform 305 is located within carrier network 303 while mobile devices 301A and 301B are located on carrier network 302. Hence, if mobile devices 301A and 301B access unified communication system 306 for unified communications services, then mobile devices 301A and 301B will not be automatically routed through IMS platform 305 because carrier network 303 is not handling the call. Without accessing IMS platform 305, mobile devices 301A and 301B may not have access to at least a subset of the unified communication services.

Not all calls to unified communication system 306 will need to be routed through IMS platform 305. Only those calls from mobile devices that are associated with the subset of the unified communication service that is provided by IMS platform 305, such as customers of the unified communication service, will be routed through IMS platform 305. Those calls that are associated with the unified communication service will be provided with the full service to which they are subscribed. Those services may include a subset of the unified communication services provided by IMS platform 305. However, those calls from mobile devices that are not associated with the unified communication service are not routed through IMS platform 305 to access the subset of unified communication services provided by IMS platform 305.

Figure 4:
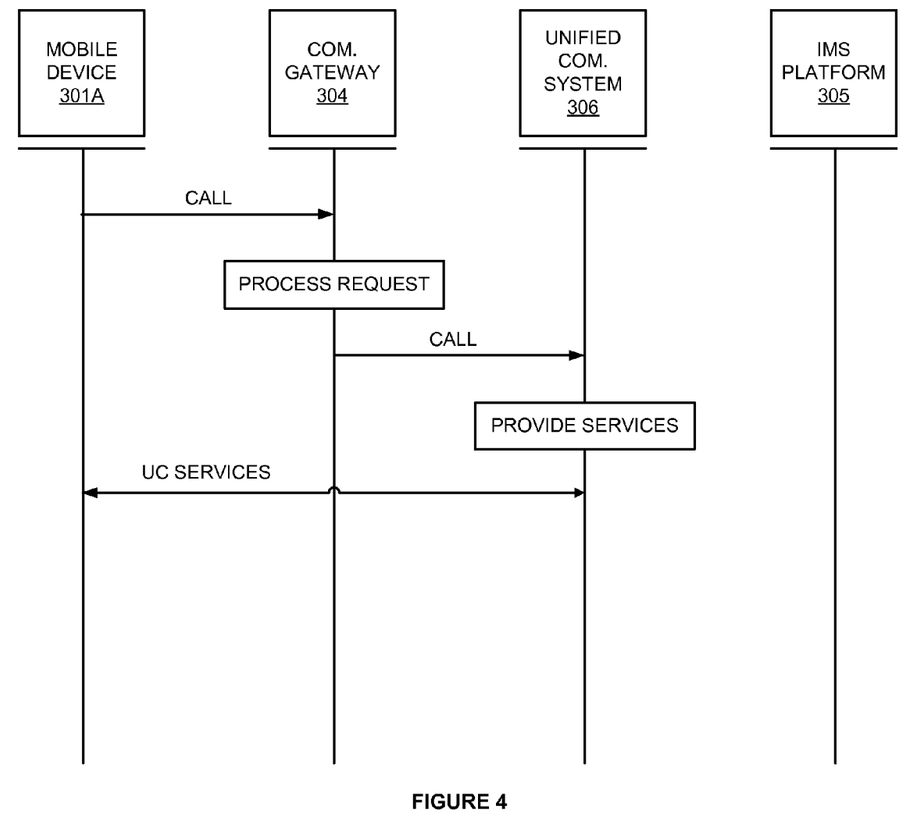
FIG. 4 illustrates the operation of a wireless communication system.

FIG. 4 is a sequence diagram illustrating the operation of communication network 300. In this example, mobile device 301A is not associated with the unified communication service. Mobile device 301A is provided communication network access via carrier network 302 over link 310.

Mobile device 301A begins by initiating a call for a unified communication service. Communication gateway 304 processes the call request to determine whether mobile device 301A is associated with the unified communication service. Communication gateway 304 may process the telephone number of mobile device 301A to determine whether that telephone number is associated with the unified communication service or communication gateway may use some other identifier for mobile device 301A, such as an IP address. Since mobile device 301A is not associated with the unified communication service, communication gateway 304 connects the call to unified communication system 306. Unified communication system 306 provides a first subset of unified communication services to mobile device 301A.

Therefore, mobile device 301A, which is not associated with the unified communication service, is not provided with a second subset of the unified communication service that is provided by IMS platform 305.

Figure 5:
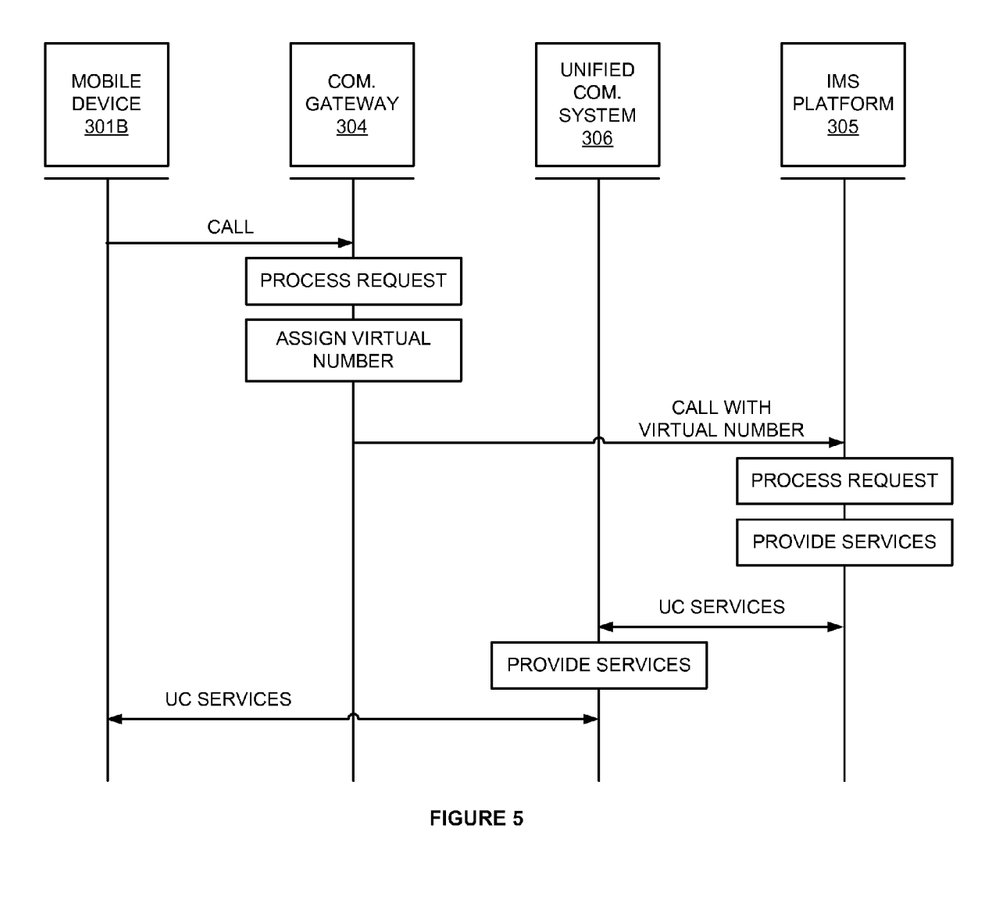
FIG. 5 illustrates the operation of a wireless communication system.

FIG. 5 is a sequence diagram illustrating the operation of communication network 300. In this example, mobile device 301B is associated with the unified communication service provided by IMS platform 305 and unified communication system 306 of carrier network 303. As with FIG. 4, mobile device 301B is provided communication network access via carrier network 302 over link 310.

Mobile device 301B begins by initiating a call for a unified communication service. Communication gateway 404 processes the call to determine whether mobile device 301B is associated with the unified communication service. As before, communication gateway 304 may process the telephone number of mobile device 301B or some other identifier for mobile device 301B. Upon determining the mobile device is associated with the unified communication service, communication gateway 304 assigns a virtual number for mobile device 301B for the call and connects the call to IMS platform 305. The virtual number may be a phone number or some other identification for mobile device 301B that IMS platform will recognize as being associated with the unified communication service. In some cases the virtual number may be the same as the actual telephone number of mobile device 301B.

IMS platform 305 receives and processes the call request with the virtual number to determine a second portion of unified communications services that are associated with the virtual number. IMS platform 305 then connects the call to unified communication system 306. Thus, IMS platform 305 provides the second portion of unified communication services to mobile device 301B while unified communication system 306 provides the first.

Figure 6:
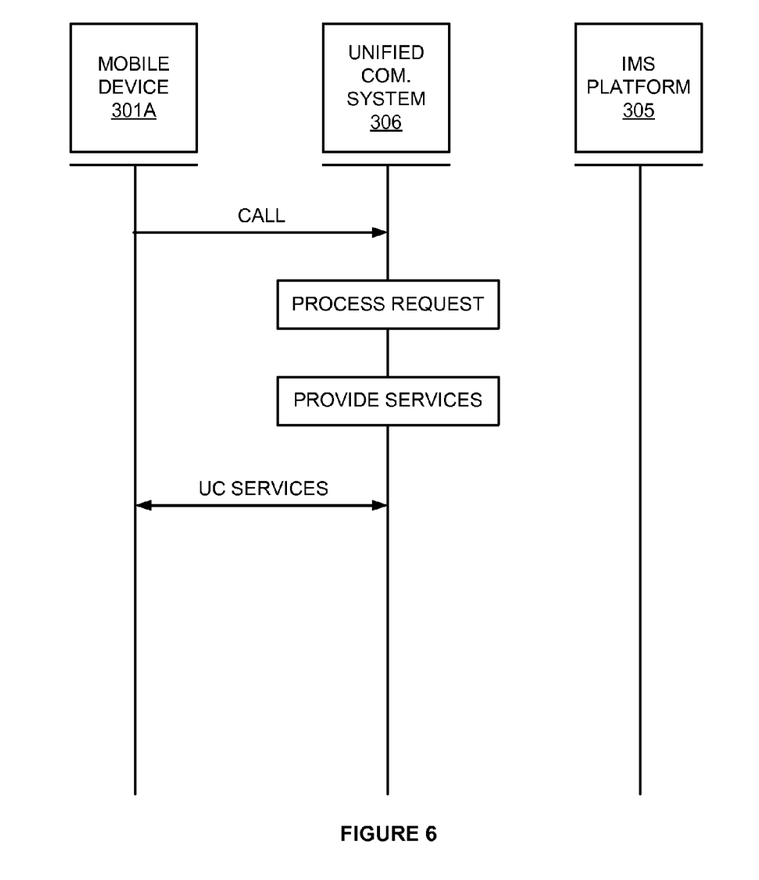
FIG. 6 illustrates the operation of a wireless communication system.

FIG. 6 is a sequence diagram illustrating the operation of communication network 300 if the functionality of communication gateway 304 is incorporated into unified communication system 306. In this example, mobile device 301A is not associated with the unified communication service. Mobile device 301A is provided communication network access via carrier network 302 over link 310.

Mobile device 301A begins by initiating a call for a unified communication service. Unified communication system 306 processes the call request to determine whether mobile device 301A is associated with the unified communication service. Unified communication system 306 may process the telephone number of mobile device 301A to determine whether that telephone number is associated with the unified communication service or communication gateway may use some other identifier for mobile device 301A, such as the IP address of mobile device 301A. Since mobile device 301A is not associated with the unified communication service, unified communication system 306 provides a first subset of unified communication services to mobile device 301A.

Therefore, mobile device 301A, which is not associated with the unified communication service, is not provided with a second subset of the unified communication service that is provided by IMS platform 305.

Figure 7:
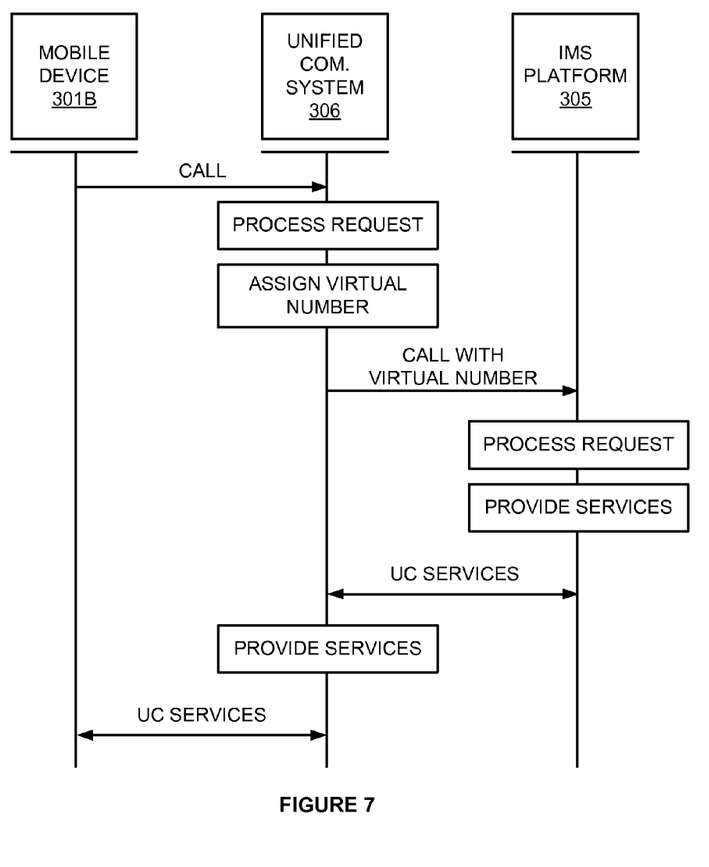
FIG. 7 illustrates the operation of a wireless communication system.

FIG. 7 is a sequence diagram illustrating the operation of communication network 300 if the functionality of communication gateway 304 is incorporated into unified communication system 306. In this example, mobile device 301B is associated with the unified communication service provided by IMS platform 305 and unified communication system 306 of carrier network 303. As with FIG. 4, mobile device 301B is provided communication network access via carrier network 302 over link 310.

Mobile device 301B begins by initiating a call for a unified communication service. Unified communication system processes the call to determine whether mobile device 301B is associated with the unified communication service. As before, unified communication system 306 may process the telephone number of mobile device 301B or some other identifier for mobile device 301B. Upon determining the mobile device is associated with the unified communication service, unified communication system 306 assigns a virtual number for mobile device 301B for the call and connects the call to IMS platform 305. The virtual number may be a phone number or some other identification for mobile device 301B that IMS platform will recognize as being associated with the unified communication service. In some cases the virtual number may be the same as the actual telephone number of mobile device 301B.

IMS platform 305 receives and processes the call request with the virtual number to determine a second portion of unified communications services that are associated with the virtual number. IMS platform 305 then connects the call to unified communication system 306. Thus, IMS platform 305 provides the second portion of unified communication services to mobile device 301B while unified communication system 306 provides the first.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Carrier networks 102 and 103 and communication network 107 are communication networks that comprise telephony switches, wireless access nodes, Internet routers, network gateways, computer systems, communication links, or some other type of communication equipment—including combinations thereof.

Control system 104 comprises a computer system and communication interface. Control system 104 may also include other components such a router, server, data storage system, and power supply. Control system 104 may reside in a single device or may be distributed across multiple devices. Communication control system 104 could be a mobile switching center, network gateway system, Internet access node, application server, service node, or some other communication system—including combinations thereof.

Intermediate system 105 comprises a computer system and communication interface. Intermediate system 105 may also include other components such a router, server, data storage system, and power supply. Intermediate system 105 may reside in a single device or may be distributed across multiple devices. Intermediate system 105 is shown externally to carrier network 103, but intermediate system 105 could be integrated within the components of carrier network 103. Intermediate system 105 could be a mobile switching center, network gateway system, Internet access node, application server, IMS core, service node, or some other communication system—including combinations thereof. Intermediate system 105 may provide audio, video, VoIP, unified communication, or some other application or service that mobile device 101 could access over carrier network 103.

Unified communication system 106 comprises a computer system and communication interface. Unified communication system 106 may also include other components such a router, server, data storage system, and power supply. Unified communication system 106 may reside in a single device or may be distributed across multiple devices. Unified communication system 106 is shown externally to carrier network 103, but unified communication system 106 could be integrated within the components of carrier network 103. Unified communication system 106 could be a mobile switching center, network gateway system, Internet access node, application server, IMS core, service node, or some other communication system—including combinations thereof. Unified communication system 106 provides at least a subset of unified communication services that mobile device 101 could access over carrier networks 102 and 103.

Wireless link 110 uses the air or space as the transport media. Wireless link 110 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 111-115 use metal, glass, air, space, or some other material as the transport media. Communication links 111-115 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication links 111-115 could be a direct link or may include intermediate networks, systems, or devices.

Figure 8:
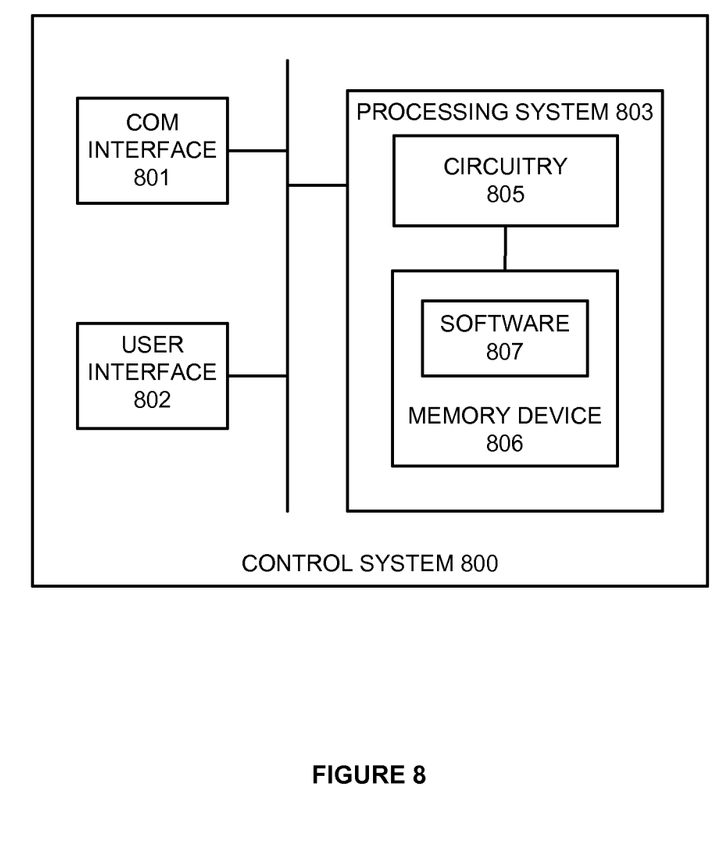
FIG. 8 illustrates a communication control system.

FIG. 8 illustrates control system 800. Control system 800 is an example of control system 104 and communication gateway 304, although control system 104 and communication gateway 304 may use alternative configurations. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a disk drive, flash drive, data storage circuitry, or some other memory apparatus. Operating software 807 comprises computer programs, firmware, or some other form of machine-readable processing instructions. Operating software 807 may include an operating system, utilities, drivers, network interfaces, applications, or some other type of software. When executed by circuitry 805, operating software 807 directs processing system 803 to operate communication control system 800 as described herein. In particular, operating software 807 directs processing system 803 to determine whether a mobile device is associated with a unified communications service as described herein.

In particular, communication interface 801 receives a call for a unified communication service originated by a mobile device in a first carrier network. Operating software 807, when executed by circuitry 805, directs processing system 803 to determine whether the mobile device is associated with the unified communication service. If the mobile device is associated with the unified communication service, then processing system 803 connects the call using communication interface 801 to a unified communication system to provide access to only a first portion of the unified communication service. If the mobile device is associated with the unified communication service, then processing system 803 connects the call using communication interface 801 to an intermediate communication system in a second carrier network using a virtual number.

Figure 9:
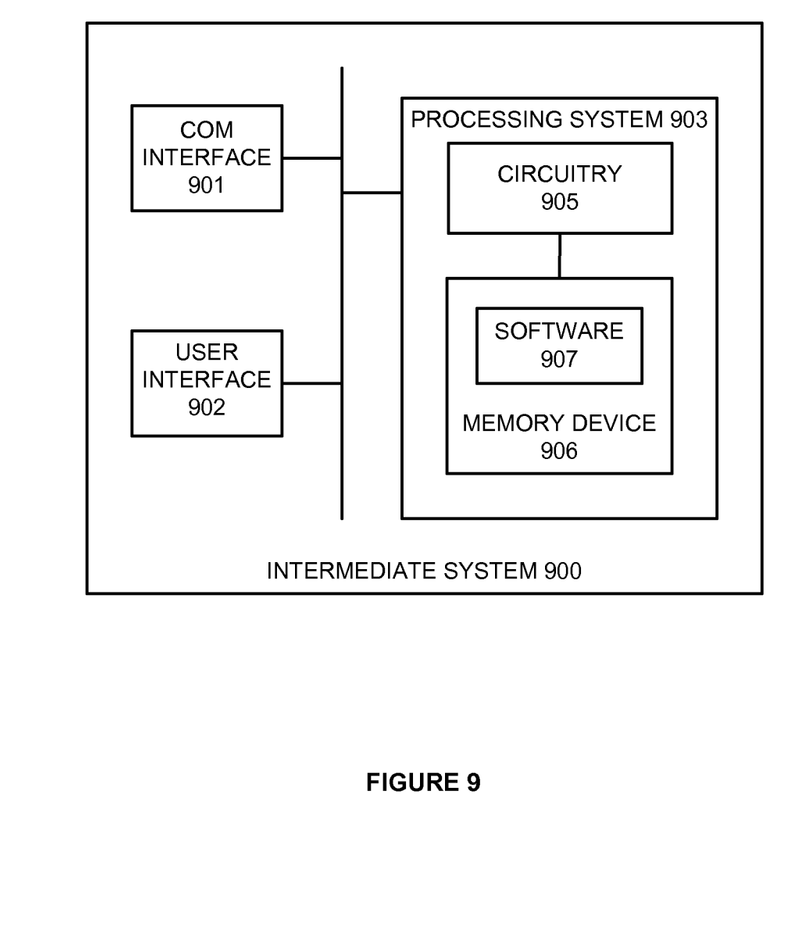
FIG. 9 illustrates an intermediate communication system.

FIG. 9 illustrates intermediate communication system 900. Intermediate system 900 is an example of intermediate system 105 and IMS platform 305, although intermediate system 105 and IMS platform 305 may use alternative configurations. Intermediate system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a disk drive, flash drive, data storage circuitry, or some other memory apparatus. Operating software 907 comprises computer programs, firmware, or some other form of machine-readable processing instructions. Operating software 907 may include an operating system, utilities, drivers, network interfaces, applications, or some other type of software. When executed by circuitry 905, operating software 907 directs processing system 903 to operate intermediate communication system 900 as described herein.

In particular, communication interface 901 receives the call and the virtual number from communication control system. Operating software 907, when executed by circuitry 905, directs processing system 903 to determine at least a second portion of the unified communication service associated with the virtual number. Processing system 903 is further directed to connect the call using communication interface 901 to the unified communication system to provide access to both the first portion of the unified communication service and the second portion of the unified communication service.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A communication system for providing unified communication services, comprising:
    a communication gateway configured to:
        receive a call for a unified communication service originated by a mobile device in a first carrier network;
        determine whether the mobile device is associated with the unified communication service;
        if the mobile device is not associated with the unified communication service, then connect the call to a unified communication system to provide access to only a first portion of the unified communication service without connecting the call to an Internet Protocol Multimedia Subsystem (IMS) platform in a second carrier network; and
        if the mobile device is associated with the unified communication service, then connect the call to the IMS platform in a second carrier network using a virtual number; and
    the IMS platform configured to:
        receive the call and the virtual number;
        determine at least a second portion of the unified communication service associated with the virtual number; and
        connect the call to the unified communication system to provide access to both the first portion of the unified communication service and the second portion of the unified communication service.

2. The communication system of claim 1 further comprising the unified communication system.

3. The communication system of claim 2 wherein the communication gateway is integrated into the unified communication system.

4. The communication system of claim 1 wherein at least one of the first and second portions of the unified communication service comprises real time voice communication services.

5. The communication system of claim 1 wherein at least one of the first and second portions of the unified communication service comprises unified messaging services.

6. A method of operating a communication system for providing unified communication services, comprising:
    in a communication gateway:
        receiving a call for a unified communication service originated by a mobile device in a first carrier network;
        determining whether the mobile device is associated with the unified communication service;
        if the mobile device is not associated with the unified communication service, connecting the call to a unified communication system to provide access to only a first portion of the unified communication service without connecting the call to an Internet Protocol Multimedia Subsystem (IMS) platform in a second carrier network; and
        if the mobile device is associated with the unified communication service, connecting the call to the IMS platform in a second carrier network using a virtual number;
    in the IMS platform:
        receiving the call and the virtual number;
        determining at least a second portion of the unified communication service associated with the virtual number; and
        connecting the call to the unified communication system to provide access to both the first portion of the unified communication service and the second portion of the unified communication service.

7. The method of claim 6 wherein the communication gateway is integrated into the unified communication system.

8. The method of claim 6 wherein at least one of the first and second portions of the unified communication service comprises real time voice communication services.

9. The method of claim 6 wherein at least one of the first and second portions of the unified communication service comprises unified messaging services.

10. A communication gateway for providing unified communication services, comprising:
    a communication interface configured to:
        receive a call for a unified communication service originated by a mobile device in a first carrier network;
    a processing system configured to:
        determine whether the mobile device is associated with the unified communication service;
        if the mobile device is not associated with the unified communication service, then connect the call to a unified communication system to provide access to only a first portion of the unified communication service without connecting the call to an Internet Protocol Multimedia Subsystem (IMS) platform in a second carrier network;
        if the mobile device is associated with the unified communication service, then connect the call to the IMS platform in a second carrier network using a virtual number; and
    wherein the IMS platform receives the call and the virtual number, determines at least a second portion of the unified communication service associated with the virtual number, and connects the call to the unified communication system to provide access to both the first portion of the unified communication service and the second portion of the unified communication service.

11. The communication gateway of claim 10 wherein the communication interface and the processing system are integrated into the unified communication system.

12. The communication gateway of claim 10 wherein at least one of the first and second portions of the unified communication service comprises real time voice communication services.

13. The communication gateway of claim 10 wherein at least one of the first and second portions of the unified communication service comprises unified messaging services.

\* \* \* \* \*